Patented July 29, 1930

1,771,553

UNITED STATES PATENT OFFICE

ROBERT ARNOT, OF WATFORD, ENGLAND

ADHESIVE OR CEMENT AND PROCESS FOR MAKING THE SAME

No Drawing. Application filed September 3, 1924, Serial No. 735,596, and in Great Britain September 15, 1923.

The object of the present invention is to provide mediums of improved characteristics which can be used as adhesives or cements or in compositions of a more or less rigid or waterproof, or rigid and waterproof nature, as well as to provide improved processes of manufacture of such adhesives, cements or compositions which will hereinafter be referred to as "waterproof compounds".

It is known that albuminoids such as ordinary glue, gelatine and other solutions of proteins, albumins or their mixture are precipitated by condensation products obtained from phenols, naphthols or their homologues by treatment with aldehydes or by other synthetic resins obtained by condensation of carbonyl compounds with organic substances such as amines, amides, hydrocarbons, and aromatic oxy compounds which synthetic resins hereinafter shall be termed "condensation products". I have discovered that solutions of glutinous bodies commonly known as liquid glues such as is obtained by the action of diluted acetic or nitric acids on glue when heated or by dissolving glue in a 20% calcium chloride solution, which liquid glues will not gelatinize or are rendered non-gelatinous do not precipitate with such condensation products although for example a solution of tannic acid will precipitate all the glutin contained in such a solution. What is obtained is a viscous very tacky liquid of the consistency of treacle which may be diluted with water, alcohols, pyridine, amines such for example as aniline, or inorganic, aliphatic or aromatic acids per se or in solution. Alexander Bogue in his book entitled "Gelatin" indicates on page 401 that gelatin which has been subjected to hydrolysis by the action of high temperature, acids, alkalis, or otherwise, is converted, in proportion to the extent of such treatment, into a non-gelatinizing substance which no longer consists of protein gelatin, but of the cleavage products proteose and peptone. These have been called beta gelatin. Other authorities, for example Richard Kissling in his book entitled "Leim und Gelatine", expresses the view that so called liquid glue consists partly of hydrolyzed glutin which is termed gelatose and partly of unconverted glutin. I believe that this so called beta gelatin or gelatose acts as a protective colloid between the condensation product and the protein gelatin and prevents precipitation thereof.

Experiments have further demonstrated that in adding a solution of blood albumin or casein to a mixture of such glue with the liquid or oil substance initially obtained when carbonyl compounds condense with organic substances such as aromatic oxy compounds, amines, amides or hydrocarbons no precipitation takes place although such proteids are coagulated if mixed simply with such oily substance.

In the belief that success would attend the use of other matters a series of tests over a wider range were made which showed that the aforesaid discoveries were not restricted to the use of liquid glues, but that generically the invention is to be regarded as the employment, in combination with artificial resin solutions and proteids or proteoids, of disperse systems under which are included colloidal sols or such oils as contain mucous substances in colloidal state or asphalts, resins, or other matter in ultra-microscopic dispersion, which oils are, according to more recent researches, considered as disperse phases which will act as protective colloids and prevent a reaction of the artificial resins on the proteids or proteoids. The expression "proteoid" is intended to refer to albumin bodies of the gelatine group in contradistinction to fibrin, albumin, casein and the like, which will be hereinafter referred to by the expression "proteids" whereas "proteoids" may for the purpose of the present specification be regarded as "proteids" of the gelatine group. (See Thiele: Leim und Gelatine, second edition, page 2.)

Such disperse systems are for instance liquid glues, gum arabic solution, dextrine solution, glycerinosols, glucose, vegetable glues such as pastes from starches, sea-weeds, agar-agar, etc., solutions of soaps, resinates, linoleates, india-rubber solutions, oil emulsions, that is emulsions of oil and water made by addition of emulsifying agents or emulsions of sulphonated oils and water. By soaps is to be understood the alkaline salts of the higher fatty acids, while by "resinates" and "linoleates" are to be understood the salts of resin and lineolic acids respectively, and by the expression "oil emulsions" is to be understood the emulsions prepared with oils and water by means of emulsifying agents or emulsions between sulphonated oils and water.

The artificial resin solutions may be first mixed or emulsified with the disperse systems and then added to the proteids or proteoids, or the disperse systems may be first mixed with the proteids or proteoids and the liquid artificial resins added afterwards.

In the carrying out of the first discovery, a soluble condensation product which is soluble in the usual solvents, in contradistinction to the insoluble condensation products like bakelite B and C, may be used either per se or in suitable solvents. It is however more economical to use the thin oil which is formed at the beginning of the condensation between the phenols and the like and aldehydes of which not only aliphatic but also aromatic ones may be used or materials capable of evolving aldehydes. Such oily condensation product may be poured, while stirring vigorously, into liquid glue and the product thus obtained is exceedingly well suited for gluing ply woods or veneer under a pressure of say 300 lbs. to square inch at a temperature of 110–120° C. The gluing is effected in from 8–10 minutes (if the laminæ are about 1 mm. thick) the glue being thereby rendered insoluble in water. However neither such high pressure or temperature is necessary for solidifying the glue or rendering it waterproof as it will obtain these qualities after some time if allowed to dry naturally between wood or if the laminæ are treated on the surfaces touching the glue with inorganic acids. Exotic woods, some of which are difficult to glue, such for instance as teak wood, and must ordinarily be prepared before gluing, may be glued without any preparation to any other wood with the new adhesive, which does not penetrate porous veneers such as oak.

The liquid glue used for making the new adhesive may be prepared by any of the known processes, the easier way however is to soak solid glue in diluted acids until it is entirely dissolved and then heat it on a water bath until the right consistency is obtained. The excess acid may be neutralized by means of alkalis, such as ammonia or organic bases such as pyridine or its cheaper higher homologues called pyridine oil, anilin or its homologues. If phosphoric, hydrobromic, hydrochloric, sulphuric, boric or oxalic acid, the salts of which are used as fireproofing materials, are employed as solvents and neutralized afterwards with an inorganic base such as an alkali including ammonia, an earth alkali, aluminum hydroxide, zinc oxide, and lead oxide, the wood glued with the adhesive containing such salts will be rendered fireproof.

The quickest and cheapest way of liquefying glue I have found to be by heating it with water under pressure in an autoclave during several hours. The amount of water and the time of heating depend on the quality of the glue and the most favorable conditions must be ascertained by experiments. A good hide glue will be liquefied by using about 2 parts of water to one part of glue and heating it under pressure and while stirring to a temperature of about 130° C. during 2½–3 hours. If either the temperature or the time limits are materially exceeded the hydrolysis of the glue will go too far and a great loss of the adhesive power may be incurred. What is obtained is a mixture of unconverted glutin and a hydrolyzed substance which does not jelly and prevents the jellying of the glutin. This may be proved by adding to the liquid glue, which with a view to clarity I shall hereafter designate "hydrolyzed glue", an excess of alcohol which will precipitate the glutin, whereas the hydrolyzed product remains in solution and may be recovered by evaporating off the solvent. What remains is a sticky viscous liquid which will not solidify. Such a test will show that hydrolyzed glue contains a protein (glutin) and a cleavage product. It is this latter product which acts as the protective colloid between the glutin or other proteins which I may use in my process and the condensation product. Hydrolyzed glue is a material which contains protein and a protective colloid and therefore a waterproof liquid adhesive is obtained on mixing it with a condensation product.

I have found that a liquid glue of greater adhesiveness, however, results if the reaction is carried out at a lower temperature without lowering the pressure. This condition I attain by adding liquids with a low boiling point such as methyl alcohol or acetone. In my extended experiments I discovered that the adhesiveness of a glue solution heated under pressure is a function of time and that the shorter the time of reaction the less the adhesiveness will be impaired. I found that the time of reaction may be curtailed by adding to the water accelerators in small proportions not exceeding 5 percent of the water used for the hydrolysis. Such accelerators are: acid alkali salts, alkali carbonates, sulphides, hydrosulphides, borax, waterglass, soaps, ammonia, hydrogen peroxide, oxides, hydroxides of alkalis and earth alkalis, soluble salts of aromatic sulphonic acids, organic bases like amines, pyridine, sugars. Into such a solution the glue preferably in powdered form is poured while stirring and I may add to such mixture a liquid of low boiling point.

Glues may be quickly liquefied by heating in a waterbath gluepowders with double the amount of a solution containing from 10 to 20% of zinc chloride or calcium chloride. A liquefaction of glues without heating which will render them less liable to coagulate with condensation products or even proof against precipitation may be obtained by mixing them with oils, solution of soaps (the intended scope of the expression "oils" and "soaps" having been hereinbefore set forth), glucose, fructose, dextrin, gum arabic, starches, acetin, ammonia, pyridine or a mixture of such liquids, ammonium sulphide, aniline, toluidine, formic-, acetic-, latic-, oxalic-, citric-, tartaric- and other organic and inorganic acids, such as hydrochloric, nitric, phosphoric and sulphuric acids, amylalcohol, amylacetate. Strongly oxidizing acids have a tanning effect on glues and are therefore not well suited for this purpose.

As a very economical way of producing a liquid phenolformaldehyde condensation product, I have found that hypochlorites accelerate the condensation considerably if added to the mixture of both components at the beginning of the reaction, the condensation taking place in about 15 minutes at a temperature of about 100° C.

When calcium hypochlorite is used the oily condensation product will form with the liquid glue a very strong adhesive.

As will be obvious other ingredients may be added at the suitable stage in the manufacture of the adhesive to impart other desired characteristics thereto such as a greater or lesser degree of elasticity or quicker solidification. For example, there may be added to the liquid glue rubber latex or a factis solution.

Similarly the addition of casein or blood albumin may impart greater consistency to the adhesive. The addition of fillers such as zinc oxide, kieselguhr, graphite, or wood dust is advisable when an adhesive of a thick nature is desired.

In some cases glue which has been precipitated by condensation products such as first herein referred to may be liquefied by allowing it to stand with strong acids such as acetic or phosphoric acid whereby a thick tacky liquid is obtained which may be thinned out as by means of alcohol.

The product, as experiments have shown may be used for many purposes; it may be employed for instance as an adhesive in making cardboards by mixing paper pulp with it and heating it in a steampress. Or it may serve as a cement for uniting together broken china or glass. Or it may be used as the base of plastic compounds and so forth. Though the proportions, conditions and additions may be varied the following examples will demonstrate how the invention may be carried into effect.

*Example I*

500 parts of 40% formaldehyde are run into 1000 parts of dark cresylic acid (97%) which is slowly stirred in a steam jacketed covered pan provided with a reflux cooler and then 20 parts of finely powdered bleaching powder are added. The temperature is kept at about 90° C. The reaction starts at once and as a rule is completed within 30 minutes. The stirring is then interrupted and the mixture allowed to stand for an hour, after which time the oily condensation product has separated from the watery liquid at the bottom of the pan. It is run, while still hot into the liquid glue which is prepared as follows:

24 parts of sodium bicarbonate are dissolved in 2000 parts of water which is in a steamjacketed autoclave and while being stirred 1200 parts of ground hideglue are run into this solution. The autoclave is then closed, the temperature raised to about 130° C. and the contents at this heat continually stirred, for 2½–3 hours. The contents, a sticky transparent liquid, are then, while still hot, pressed over by the pressure in the autoclave or run into a vat provided with a stirrer and the oily condensation product is run into the liquid glue while stirring. The ultimate product obtained after the components are thoroughly mixed is a very tacky liquid. If for certain purposes such a glue of a more fluid consistency be desired, for example for spraying, the oily condensation product may be diluted with a suitable solvent such as methylated spirit, methyl alcohol, amylalcohol, acetic acid, or acetone.

For special purposes in the manufacturing of plywood which may be exposed to steaming or boiling before being moulded, a cement prepared according to the following prescription will have all desired qualities:

*Example II*

1000 parts of finely powdered dry blood albumin are added, while stirring, into a solution of 110 parts of carbamide in 1100 parts of water at room temperature, the mixture then being stirred for an hour. A homogeneous sticky black mass is obtained which is run into the hydrolyzed glue prepared as described in connection with Example I, the temperature of which has been brought down to about 55° C. by stirring. The mixture is well stirred for a quarter of an hour and then the liquid cresol-formaldehyde condensation product, is run into it. The stirring is continued for about ½ hour until a thorough mixing has taken place and a bluish grey very tacky mass is obtained, which will retain its liquid homogeneous consistency, that is to say, without separation of the various components, for any length of time and therefore is always ready for use. This adhesive may be too thick for certain purposes, and if so, the oily condensation product may be diluted with a suitable solvent such as previously mentioned.

To impart to the glue a high degree of elasticity, india rubber or factis may be used by adding their solutions to the liquid glue. An adhesive of greater elasticity is also obtained in the manner as described in the following example:

*Example III*

30 parts of india rubber are heated to 120°–130° C. with 120 parts of dekalin which is dekahydronaphthalene in a closed vessel with reflux cooler and stirrer and then 210 parts of dark cresylic acid (97%) are added. After being thoroughly mixed 60 parts of paraformaldehyde are gradually run into this mixture. The temperature is maintained at between 120–130° C. After heating for 3 hours a very viscous, thick liquid results whiich is run, while still hot, into 600 parts of hydrolyzed glue of a temperature of about 60° C. and which has been prepared according to Example I. The mixture is then continually stirred for about half an hour. An exceedingly sticky mass is obtained, with which a very elastic gluing is obtained.

*Example IV*

140 parts of Chinese wood oil factis is dissolved by boiling it at 90°–91° C. for 1½ hours with a mixture of 350 parts of dark cresylic acid and 300 parts of alcoholic alkali (containing 10% of caustic soda) in a closed vessel provided with reflux cooler and stirrer. While being continually stirred 300 parts of 40% formaldehyde are gradually run into the mixture which is heated for 2 hours at 85° C. There results a very viscous brown liquid which is run into 1000 parts of warm hydrolyzed glue, of a temperature of about 40° C., the mixture being well stirred for about half an hour, when a very tacky yellow liquid is obtained.

*Example V*

100 parts of factis are dissolved in 400 parts of alcoholic caustic soda containing 10% caustic soda by heating the mixture to 70°–80° C. in a closed vessel provided with stirrer and reflux cooler. The alcohol is then distilled off and the residue dissolved in 200 parts of cold water and diluted sulphuric acid of 1.3 specific gravity added until sour reaction is perceptible by tests with red Congo paper. A tacky oil will separate which by repeated washing first with hot and then with cold water will be rendered neutral, the final washing being with cold water because it separates from the oil better than does hot water.

30 parts of this oil are heated with 260 parts of cresylic acid to about 80° C. and then 60 parts of paraformaldehyde are gradually added to the well stirred solution. After heating this mixture for about 3 hours at about 120° C. a very tacky, oily liquid is obtained which is run into 700 parts of warm hydrolyzed glue of a temperature of about 60° C. while stirring. The resulting product is a yellow tacky liquid.

*Example VI*

One part of soap, which, as hereinbefore stated, is intended to mean the alkaline salts of the higher fatty acids, is dissolved preferably in powdered form in 5 parts of hot water of about 60° C. and this solution well mixed with 5 parts of oily condensation product such as prepared according to Example I until the mixture is emulsified. The emulsion is run into 20 parts of a hot glue solution (which is obtained by soaking glue in cold water over night and melting the jelly on a water bath at about 60° C.), and ground in a wet grinding mill such as is used for grinding wet paints, to a homogeneous mass of the consistency of treacle which may be thinned out with hot water. The mixing may be effected, if preferred, between differential rolls or masticators, or in colloidal mills.

*Example VII*

One part of oily condensation product prepared according to Example I is well mixed with one part of hydrolyzed glue of about 50° C. and the homogeneous mixture added to one part of hot glue solution prepared according to Example VI while being well stirred. A transparent very tacky liquid results which is diluted with a tenth of its weight of acetic acid, while heating the mixture to about 60° C. in order to obtain a liquid adhesive which will spread easily.

*Example VIII*

A solution of starch is prepared by mixing ten parts of cassava starch with ten parts of water and then pouring this paste into 50 parts of boiling water while well stirring. In order to increase the adhesiveness of this paste 3.5 parts of a caustic soda solution containing 30% of sodium hydroxide are added. With this starch paste 70 parts of liquid cresol-formaldehyde condensation products are well mixed and this mixture then added to a concentrated solution of blood albumin such as described in Example II. The mass is well mixed in a suitable mill and thus a homogeneous semi-liquid adhesive results.

*Example IX*

A solution of 30 parts of gum arabic in 30 parts of water is well stirred with 30 parts of liquid cresol-formaldehyde condensation product whereby a very tacky liquid is obtained. It is run into a strong solution of 80 parts of blood albumin such as may be prepared according to Example II and thoroughly mixed in a mill. There results a thick, exceedingly sticky paste which may be thinned out with water.

The liquid cements obtained from liquid cresol-formaldehyde condensation products and proteids or proteoids by means of protective colloids or emulsions when heated above 110° C. will solidify and thereby furnish a very effective gluing. It is obvious that other ingredients may be added to make these cements suited for the purpose for which they are to be used.

What I claim is:

1. An adhesive compound comprising a mixture containing a liquid resinous condensation product of an aromatic oxy-compound with an aldehyde, a protein containing aqueous solution and sufficient of a protective colloid to maintain the proteins dissolved.

2. An adhesive compound comprising a liquid resinous condensation product of an aromatic oxy-compound with formaldehyde, dissolved blood albumen and sufficient of a protective colloid to prevent precipitation of the albumen.

3. An adhesive compound comprising a protein containing aqueous solution, a liquid resinous condensation product of cresylic acid with formaldehyde and sufficient of a protective colloid to prevent precipitation of the proteins.

4. An adhesive compound comprising a liquid resinous condensation product of an aromatic oxy-compound with formaldehyde condensed by means of a hypochlorite, a protein containing material and sufficient of a protective colloid to prevent precipitation of the proteins.

5. An adhesive compound comprising a liquid resinous condensation product of cresylic acid and formaldehyde condensed by means of bleaching powder, dissolved protein material, and sufficient of a protective colloid to prevent precipitation of the proteins.

6. A process of preparing a waterproof adhesive compound which comprises condensing cresylic acid with about half its weight of a 40% formaldehyde solution by means of bleaching powder which is added only in small proportions not exceeding 5% of the weight of the cresylic acid, separating the oily condensation product from the aqueous layer, mixing it with about three times it weight of hydrolyzed glue and about double its weight of a blood albumin solution.

7. A process of making a waterproof adhesive compound which comprises dissolving blood albumen in a solution of carbamide, the weight of the carbamide not exceeding 10% of the blood albumen, adding the blood albumen solution to about two-thirds of its weight of hydrolyzed glue and mixing the resultant mass with about one-fifth of its weight of a condensation product of cresylic acid with formaldehyde.

8. A process of making a waterproof adhesive compound which comprises dissolving glue in about 1½ times its weight of a 2% aqueous solution of sodium bicarbonate in an autoclave, heating the mixture during 2–4 hours to about 120° C., mixing the cooled resultant material with about 1½ times its weight of a blood albumin solution and half its weight of a liquid condensation product of cresylic acid and formaldehyde condensed by means of a hypochlorite.

9. An adhesive compound comprising a homogeneous mixture containing a liquid resinous condensation product of an aromatic oxy-compound with an aldehyde, and hydrolyzed protein, the protein being hydrolyzed to such an extent and present in such an amount that the mixture remains homogeneous.

10. An adhesive compound comprising a homogeneous mixture containing a liquid resinous condensation product of an aromatic oxy-compound with an aldehyde, and hydrolyzed glue, the glue being hydrolyzed to such an extent and present in such an amount that the mixture remains homogeneous.

In testimony whereof I affix my signature.

ROBERT ARNOT.